United States Patent [19]

Erwin

[11] 3,851,312

[45] Nov. 26, 1974

[54] MODULAR PROGRAM CONTROL APPARATUS FOR A MODULAR DATA PROCESSING SYSTEM

[75] Inventor: Floyd Dennis Erwin, La Habra, Calif.

[73] Assignee: Hughes Aircraft Company, Culver City, Calif.

[22] Filed: Feb. 22, 1973

[21] Appl. No.: 334,801

Related U.S. Application Data

[62] Division of Ser. No. 41,040, May 27, 1970, Pat. No. 3,745,532.

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,287,703 | 11/1966 | Slotnick | 340/172.5 |
| 3,348,210 | 10/1967 | Ochsner | 340/172.5 |
| 3,349,375 | 10/1967 | Seeber et al. | 340/172.5 |
| 3,411,139 | 11/1968 | Lynch et al. | 340/172.5 |

*Primary Examiner*—Harvey E. Springborn
*Attorney, Agent, or Firm*—W. H. MacAllister; Richard J. Rengel

[57] ABSTRACT

A modular program control apparatus for modular data processing in parallel processing logic units including functional character modules providing individual modules of each of the logic processing units including data storage modules and logic modules for processing data from memory including main memories and peripheral data storage equipment. The program control is modular and includes a control character for generating micro-program addresses, a micro-memory for storage of program control words accessed for micro-programming control of the parallel processing and providing for modular expansion according to the modular configuration of the data processors including parallel access of control words for concurrent data processing by modular logic units operating to process data in parallel. Each of the control words includes a plurality of instructions which are sequentially executed with a common constant and other fields of the program control word.

8 Claims, 4 Drawing Figures

MODULAR PROGRAM CONTROL APPARATUS FOR A MODULAR DATA PROCESSING SYSTEM

CROSS-REFERENCE TO RELATED APPLICATION

This application is a division of copending U.S. application Ser. No. 41,040, filed May 27, 1970 for MODULAR DIGITAL PROCESSING EQUIPMENT, now U.S. Pat. No. 3,745,532, the entire disclosure of which is incorporated by reference.

SUMMARY OF THE INVENTION

Modularity is provided at a functional level which provides for expandibility of control capacity within the program control according to the operational capacity of the data processor or parallel data processors interconnected for interchange of data for concurrent processing of common data. Since functional modular expansion capability provides for operational expansion within the parallel data processing logic units, e.g., register storage character module, a general logic character module, arithmetic logic character module and input/output character module; the control for the expandible logic unit or parallel units includes control function character modules to expand the control functions to meet the needs of the variable data processing operational control requirements.

Accordingly, provision is made for functional modular characters of a type each having associated therewith an input bus, an output bus, control signal receiving means, and which can selectively have input and output means associated with other functional characters of the same or different types and which can functionally cooperate with the other characters to provide expandable operational capabilities in the functional characters.

Specifically, one module is a register storage character which provides the bulk of storage for operands of the micro-program. This character contains a plurality of registers of $n$ bits each accompanied by reading and writing selection gates and can additionally have simultaneous dual reading and writing capability so that the digital signal from one or more input busses can be stored and read out on one or more output busses in response to decoded control signals.

A general logic character provides the basic logic functions selectable by the micro-program. Input bussing is provided for a plurality of $n$ bit wide channels each of which can be associated with a separate other character. Logic functions that can be performed include any or all of the operations of rotate, shift (logical), no-operation, complement and incrementation in response to logic control signals operably provided by decoding logic. In addition, least significant bits and most significant bits outputs can be coupled to other similar general logic characters.

An arithmetic logic character provides the major arithmetic functions used by the micro-program. The arithmetic logic character is responsive to control signals applied to decoder logic to perform one or more of the functions: 2's complement; sum of the contents of an A and B register using addition with carry look ahead byte parallel; or alternatively to provide a mode 2 addition instead of 2 full addition or an input carry to the lowest order bit for full addition (this forced carry in conjunction with a negated operand also accomplishes a 2's complement operand for subtraction). Structurally, the arithmetic logic character includes two holding registers for the operands of the adder, the adder itself, decoding logic, and a bussing gate.

An input/output character provides input/output capabilities for the micro-program machine not only for the usual peripherals but also for main memory scratch pads and real time clocks. Operationally, the input/output character can provide for external devices including buffered and non-buffered channels. Buffer input gating can be controlled either by the external program or the input/output device itself. External storage for some of the channels is available and parity functions with odd/even control provided for some of the channels. In addition, destination and selection decoding logic is responsive to control signals for selecting the I/O channels.

A control unit includes a micromemory counter character, a micro-array character, and a micro-instruction character.

The micromemory counter character provides the micromemory address register and related functions. The $x$ address bits of the character allows addressing up to $2^x$ micromemory words. The addresses contained in a micromemory counter register serves to address the micromemory proper. A $y$ bit incrementer (where $y$ is less than $x$) automatically steps through $2^y$ micromemory address states and then repeats addresses in a micro-program ring until the micro-program issues an unconditional transfer command. In addition, a save register allows for subroutine jumps and saves the contents of the micromemory counter upon command keeping it available for reinsertion into the micromemory counter. Branching or transferring in the micromemory is provided by 2 modes: unconditional transfer of $x$ bits width; and conditional transfers of $z$ bits width where $z$ is less than $x$.

The micro-array character contains the micromemory array. The address register for accessing the micromemory array can be located in the micromemory counter character and the word register can be located in the micro-instruction register character. The micro-array character is a read only array and the presence of an address on the input lines causes the contents of the referenced location to appear on the output lines after an appropriate delay. Several micro-array characters can be combined to form a larger micromemory array.

The micro-instruction register character contains a micromemory word register. The register is one full micromemory word long divided into two instruction fields and a constant field. In operation, the two instruction fields are transferred into the register location of the first instruction field during a second time period resulting in sequential expansion of two instructions in the micromemory word.

The above indicated modular digital characters have numerous advantages. For example, fabricated computers can be expanded by word length expansion, functional expansion, parallel computation expansion, and multicomputation expansion. In addition, the modular digital characters are versatile in that they can be used to fabricate different digital devices ranging from simple operating requirements to complex operating requirements by means of only a limited number of standard modular characters. This eliminates the users need to become deeply involved with logic design and the limited number of characters permits a low inventory of off-the-shelf devices since the same character can be used numerous times and in numerous different machines. Furthermore, standard interconnects can be used between the modules thereby eliminating the need to know the specific character interconnects and can lead to complete design automation. Still further, the modular characters have the advantage that the computer can be diagnosed to isolate a malfunctioning component which can be removed and replaced in a facile manner. These advantages have the attendant advantage of low cost.

BRIEF DESCRIPTION OF THE DRAWINGS

FIGS. 1 to 60, inclusive are illustrated in the sheets of drawings and described in the copending application. FIGS. 1 and 2*a* to 2*c* of the accompanying sheets of drawings are also briefly described herein as follows:

FIG. 1 is a block diagram illustrating an exemplary digital device including a register unit, a logic unit, and a control unit all fabricated from different ones of the modular digital characters;

FIGS. 2*a* through 2*c* are graphical illustrations of: a micromemory word; one of the instruction fields of the micromemory word; and the constant and the machine control field of the micromemory word.

DESCRIPTION OF THE PREFERRED EMBODIMENTS

The detailed description of the preferred embodiments of the invention is in the copending application.

Figure 1:
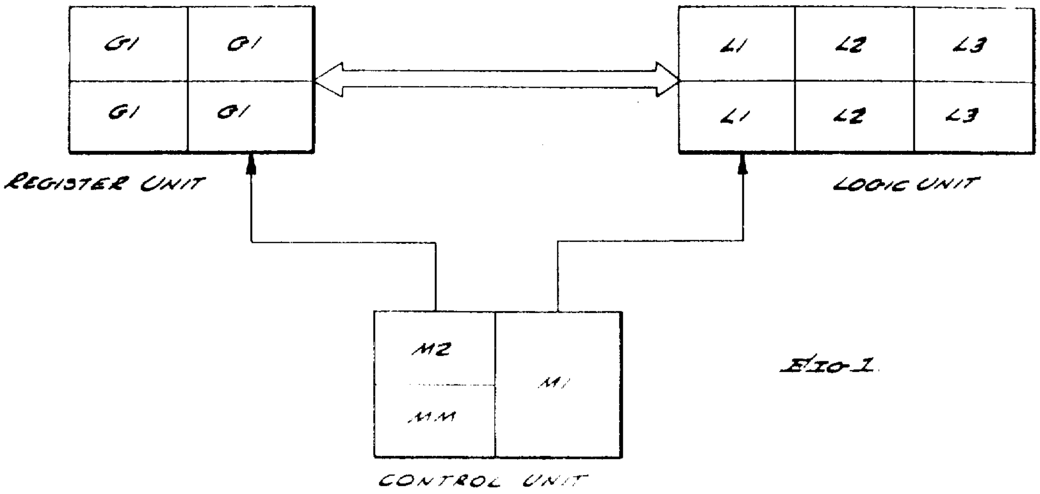
Figure 2A:
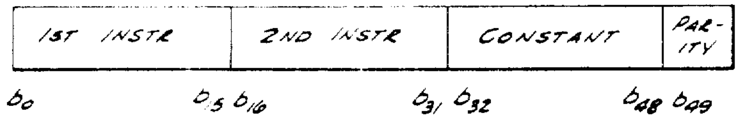
Figure 2B:
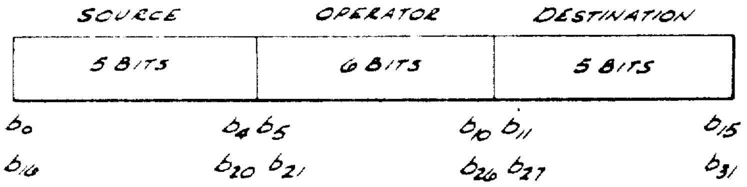
Figure 2C:
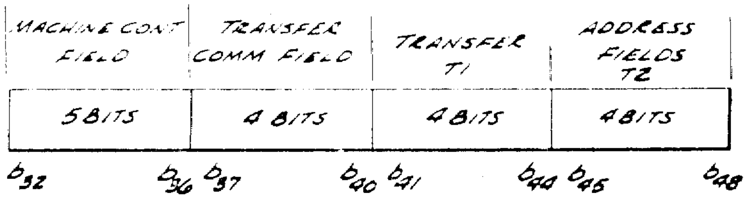

In particular with reference to the control aspects of the present application, material portions are set forth as follows:

FIGS. 1, 2-2*c*, described in the copending application;

FIG. 4, timing described in the copending application;

FIGS. 9 to 15, control for G1 expansion described in the copending application;

FIGS. 31 to 35, control for L1 expansion described in the copending application;

FIG. 41, control for L2 expansion described in the copending application;

FIG. 47, control of L3 expansion described in the copending application;

FIGS. 48 to 60, control unit and functional control characters described in the copending application.

It is in the nature of control that all circuits of the computer are affected and the detailed disclosure includes a description of control in portions not specifically referred to supra. Accordingly, reference is only made to those portions that provide a basis for an overall understanding of the control arrangement for the modular data processing system of the present invention.

What is claimed is:

1. A modular micro-program control apparatus for a modular data processing system comprising:

a modular logic unit for processing data including a plurality of data modules including a data storage module having a data bus input for receiving words of data parallel by bit and also having a plurality of data bus outputs for concurrently supplying words of data; each of said plurality of data modules including at least a data bus input, a data bus output, and control bus inputs;

a modular control unit for micro-programming control of the logic unit, said control unit comprising a control word sequencer module including means for generating a sequence of addresses of micro-control words of a command, a plurality of micromemory modules receiving the sequence of addresses supplied by said sequencer module for concurrently outputting a plurality of micro-control words from storage in the plurality of micromemory modules according to each address of the sequence to provide parallel groups of control signals, each group being determined by the respective one of the concurrently outputted micro-control words; and a plurality of control busses for supplying the groups of control signals in parallel to respective control bus inputs of predetermined ones of said data modules according to respective ones of the plurality of micro-control words concurrently accessed to provide parallel processing of data by the data modules.

2. The modular micro-program control apparatus according to claim 1 in which said control word sequencer module includes a control bus input for receiving at least one group of said group of control signals supplied by said control busses.

3. The modular program control apparatus of claim 1 in which said control word sequencer module includes a plurality of control bus inputs for receiving the plurality of groups of control signals supplied by said control busses.

4. A modular micro-program control apparatus for a modular data processing system comprising:

a control unit including a micro-program address generator module for generating individual sequences of addresses for execution of respective commands of a program;

a plurality of micromemory modules, each memory module having control word storage locations for storing control words which are sequentially accessed according to the sequential addresses supplied by said address generator module for producing corresponding sequential groups of control signals, and a control bus output;

a plurality of data modules for processing data, each data module having a plurality of control bus inputs for receiving respective sequential groups of control signals at the respective control bus inputs for processing data in accordance with the respective sequential groups of control signals provided by a sequence of control words supplied by the memory modules; and a plurality of control busses for supplying respective sequential groups of control signals to respective control bus inputs of the data modules.

5. The modular program control apparatus according to claim 4 in which a control word register module is provided for each micromemory module for receiving the outputted control word to supply the sequential groups of control signals to respective control busses.

6. The modular program control apparatus according to claim 5 in which a control word accessed from at least one of the memory modules includes a plurality of instructions and said control word register module includes a plurality of instruction registers, one of which is a primary register, for storing respective ones of the instructions;

said plurality of instruction registers including interconnecting means for supplying the instruction stored in a non primary register to the primary instruction register for outputting groups of control signals sequentially from said primary register for execution of the instructions by said data modules.

7. The modular program control apparatus according to claim 6 in which said control word includes both instruction fields and control fields and one of said instructions and said control fields is transferred directly from the micromemory module to the primary instruction register for outputting a first group of control signals from said primary register on the respective control bus.

8. The modular program control apparatus according to claim 7 in which said primary register includes decoder means for decoding the instructions and control fields to produce the first group of control signals for executing the instruction stored in the primary register in accordance with said control fields in the primary register and sequentially executing, in accordance with the control fields, the plurality of instructions stored in the plurality of registers and sequentially transferred to the primary instruction register.

* * * * *